United States Patent
Woo et al.

(10) Patent No.: US 10,020,903 B2
(45) Date of Patent: Jul. 10, 2018

(54) METHOD, DEVICE, AND NON-TRANSITORY COMPUTER-READABLE RECORDING MEDIUM FOR SUPPORTING RELAY BROADCASTING USING MOBILE DEVICE

(71) Applicant: 39degrees C Inc., Seoul (KR)

(72) Inventors: Seung Won Woo, Seoul (KR); Hyun Goo Park, Seoul (KR)

(73) Assignee: 39degrees C Inc., Seoul (KR)

( * ) Notice: Subject to any disclaimer, the term of this patent is extended or adjusted under 35 U.S.C. 154(b) by 73 days.

(21) Appl. No.: 15/333,940

(22) Filed: Oct. 25, 2016

(65) Prior Publication Data

US 2017/0149515 A1    May 25, 2017

(30) Foreign Application Priority Data

Nov. 19, 2015 (KR) .................. 10-2015-0162538

(51) Int. Cl.
*H04H 20/08* (2008.01)
*H04B 3/36* (2006.01)
*H04W 88/04* (2009.01)

(52) U.S. Cl.
CPC .............. *H04H 20/08* (2013.01); *H04B 3/36* (2013.01); *H04W 88/04* (2013.01)

(58) Field of Classification Search
CPC .......... H04B 3/36; H04H 20/08; H04W 88/04
See application file for complete search history.

(56) References Cited

U.S. PATENT DOCUMENTS

| 7,456,875 | B2 | 11/2008 | Kashiwa |
| 9,723,193 | B2 | 8/2017 | Takahashi |
| 2005/0130587 | A1* | 6/2005 | Suda ............... H04B 7/15564 455/9 |
| 2007/0171818 | A1* | 7/2007 | Shoji ................. H04B 7/26 370/229 |
| 2008/0081553 | A1* | 4/2008 | Kanda ............. H04W 88/085 455/7 |
| 2009/0073918 | A1* | 3/2009 | Conforto ........... H04B 7/18536 370/316 |
| 2014/0267749 | A1 | 9/2014 | Frigon |
| 2015/0036578 | A1* | 2/2015 | Wu .................... H04B 7/15 370/312 |
| 2015/0280807 | A1* | 10/2015 | Ode ............... H04B 7/15535 370/311 |
| 2017/0018182 | A1* | 1/2017 | Makled ............ G01C 21/36 |

FOREIGN PATENT DOCUMENTS

| JP | 11-133936 A | 5/1999 |
| JP | 2003-274358 A | 9/2003 |
| JP | 2009-267999 A | 11/2009 |
| JP | 2013-026787 A | 2/2013 |
| KR | 10-0523761 B1 | 10/2005 |
| KR | 10-2008-0043492 A | 5/2008 |

* cited by examiner

*Primary Examiner* — Brian D Nguyen
(74) *Attorney, Agent, or Firm* — Novick, Kim & Lee PLLC; Jae Youn Kim (57) ABSTRACT

Provided are a method, device, and non-transitory computer-readable recording medium for supporting relay broadcasting using a mobile device. It is possible to reduce a computing load of a repeater device by distributing a computing load required to produce relay broadcasting content to a plurality of photographer devices and thus widen the range of photographer devices that may participate in relay broadcasting.

15 Claims, 7 Drawing Sheets

METHOD, DEVICE, AND NON-TRANSITORY COMPUTER-READABLE RECORDING MEDIUM FOR SUPPORTING RELAY BROADCASTING USING MOBILE DEVICE

CROSS-REFERENCE TO RELATED APPLICATION

This application claims the benefit of priority of Korean Patent Application No. 10-2015-0162538, filed on Nov. 19, 2015, in the Korean Intellectual Property Office, the disclosure of which is incorporated herein in its entirety by reference.

BACKGROUND

1. Field

One or more embodiments relate to a method, device, and non-transitory computer-readable recording medium for supporting relay broadcasting using a mobile device.

2. Description of the Related Art

Basically, many hardware resources (e.g., a central processing unit (CPU), a memory, etc.) are required to process video signals or audio signals. Thus, expensive high-end equipment is required to process and edit video signals and audio signals that are input through several channels in real time to produce relay broadcasting signals. Recently, as broadcasting communication technology is developed, such equipment has increased performance and has been popularized. However, resolution and quality of video signals and audio signals to be processed by the equipment also have increased. Thus, it is, in fact, difficult to process and edit a plurality of video signals and audio signals without expensive high-end equipment.

In particular, general users may generate their own videos or audios using cameras or microphones included in their mobile devices such as smartphones or tablets. However, such mobile devices may perform only simple operations (e.g., an upload or download) on video signals or audio signals generated by the users due to limitations in performance. Such mobile devices have difficulty producing relay broadcasting content obtained by combining several video signals and audio signals. Thus, there are limitations in using videos and audios that may be generated using the mobile devices in various ways.

SUMMARY

One or more embodiments are intended to distribute a computing load required to produce relay broadcasting content for video data or audio data received from a plurality of mobile devices by receiving first sampling video data and first sampling audio data of first video data and first audio data, respectively, generated by a first photographing device, receiving second sampling video data and second sampling audio data of second video data and second sampling audio data, respectively, generated by a second photographing device, providing at least one of the first sampling video data, the first sampling audio data, the second sampling video data, and the second sampling audio data to a repeater through a repeater device, generating editing data for editing relay broadcasting content including at least one of the first sampling video data, the first sampling audio data, the second sampling video data, and the second sampling audio data with reference to an input for editing at least one of the first sampling video data, the first sampling audio data, the second sampling video data, and the second sampling audio data, and adaptively determining quality of at least one of the first sampling video data, the first sampling audio data, the second sampling video data, and the second sampling audio data on the basis of the editing input.

Additional aspects will be set forth in part in the description which follows and, in part, will be apparent from the description, or may be learned by practice of the presented embodiments.

According to one or more embodiments, a method of supporting relay broadcasting using a mobile device, which is performed by a repeater device, includes receiving first sampling video data and first sampling audio data of first video data and first audio data, respectively, generated by a first photographer device and receiving second sampling video data and second sampling audio data of second video data and second audio data, respectively, generated by a second photographer device; providing at least one of the first sampling video data, the first sampling audio data, the second sampling video data, and the second sampling audio data to the repeater device; and generating data for editing relay broadcasting content including at least one of the first sampling video data, the first sampling audio data, the second sampling video data, and the second sampling audio data with reference to an input of a repeater for editing at least one of the first sampling video data, the first sampling audio data, the second sampling video data, and the second sampling audio data, wherein quality of at least one of the first sampling video data, the first sampling audio data, the second sampling video data, and the second sampling audio data, which is transmitted from the first photographer device or the second photographer device and then received by the repeater device, is adaptively determined based on the editing input; a control signal for adaptively determining the quality is transmitted from the repeater device to the first photographer device or the second photographer device; quality of data to be edited is determined to be higher than quality of data not to be edited; and quality of specific data to be edited is determined to be higher than quality of the specific data before or after it is determined that the data is to be edited.

According to one or more embodiments, a device for supporting relay broadcasting using a mobile device includes: a data receiver configured to receive first sampling video data and first sampling audio data of first video data and first audio data, respectively, generated by a first photographer device and receive second sampling video data and second sampling audio data of second video data and second audio data, respectively, generated by a second photographer device; and a relay broadcasting content editor configured to provide at least one of the first sampling video data, the first sampling audio data, the second sampling video data, and the second sampling audio data to a repeater device and generate data for editing relay broadcasting content including at least one of the first sampling video data, the first sampling audio data, the second sampling video data, and the second sampling audio data with reference to an input of a repeater for editing at least one of the first sampling video data, the first sampling audio data, the second sampling video data, and the second sampling audio data, wherein quality of at least one of the first sampling video data, the first sampling audio data, the second sampling video data, and the second sampling audio data, which is transmitted from the first photographer device or the second photographer device and then received from the repeater device, is adaptively determined based on the editing input; a control signal for adaptively determining the quality is transmitted from the repeater device to the first photographer device or the second photographer device; quality of data to be edited is determined to be higher than quality of data not to be edited; and quality of specific data to be edited is determined to be higher than quality of the specific data before or after it is determined that the data is to be edited.

In addition, other methods and devices for implementing the present invention and a computer-readable recording medium for recording a computer program for executing the methods are further provided.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and is not to be construed as being limited to the descriptions set forth herein. Accordingly, the embodiments are merely described below with reference to the figures to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following detailed description refers to the accompanying drawings that illustrate exemplary embodiments consistent with the present invention. These embodiments will be described in sufficient detail to enable those skilled in the art to practice the present invention. It should be understood that the various embodiments, although different, are not necessarily mutually exclusive. For example, a particular feature, structure or characteristic described herein in connection with one embodiment may be implemented within other embodiments without departing from the spirit and scope of the present invention. In addition, it should be understood that the location or arrangement of individual elements within each embodiment disclosed may be modified without departing from the spirit and scope of the present invention. The following detailed description is, therefore, not to be taken in a limiting sense, and when appropriately described, the scope of the present invention is defined only by the appended claims, appropriately interpreted along with the full range of equivalents to which the claims are entitled. In the drawings, like numerals refer to the same or similar elements throughout several views.

Hereinafter, various embodiments of the present invention will be described in more detail with reference to the accompanying drawings so that a person skilled in the art can easily practice the invention.

Entire configuration of system.

Figure 1:
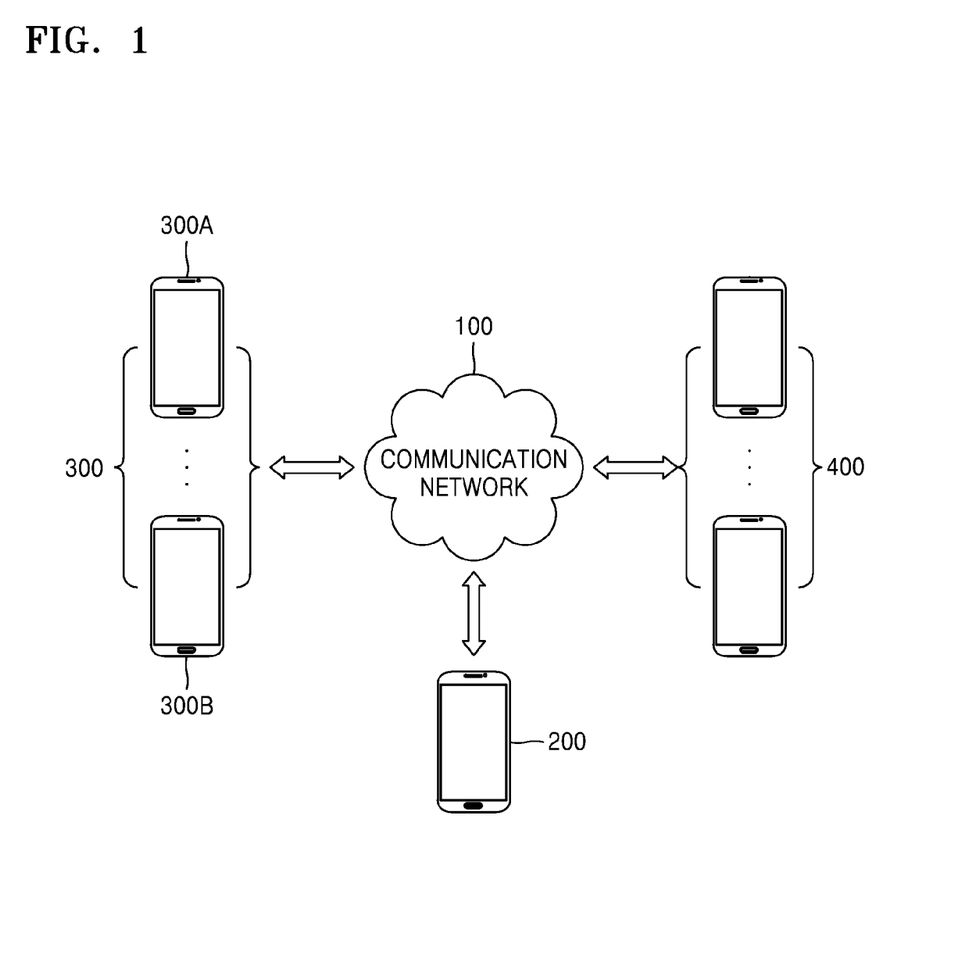
FIG. 1 is a diagram illustrating an entire configuration of a system for implementing the present invention.

FIG. 1 is a diagram illustrating an entire configuration of a system for implementing the present invention.

As shown in FIG. 1, a system according to an embodiment of the present invention may include a communication network 100, a repeater device 200, a photographer device 300, and a viewer device 400.

According to an embodiment of the present invention, the communication network 100 may be configured without regard to a communication aspect such as wired communication or wireless communication and may include various communication networks such as a local area network (LAN), a metropolitan area network (MAN), a wide area network (WAN), etc. For example, the communication network 100 used herein may include a well-known short-range wireless communication network such as Wi-Fi, Wi-Fi Direct, LTE Direct, and Bluetooth. However, the communication network 100 may at least partially include, but is not limited to, a well-known wired or wireless data communication network, a well-known telephone network, or a well-known wired or wireless television communication network.

Next, the repeater device 200 according to an embodiment of the present invention may receive first sampling video data and first sampling audio data of first video data and first audio data, respectively, generated by a first photographer device 300A, receive second sampling video data and second sampling audio data of second video data and second audio data, respectively, generated by a second photographer device 300B, provide at least one of the first sampling video data, the first sampling audio data, the second sampling video data, and the second sampling audio data to a repeater through a repeater device 200, generate editing data for editing relay broadcasting content including at least one of the first sampling video data, the first sampling audio data, the second sampling video data, and the second sampling audio data with reference to an input for editing at least one of the first sampling video data, the first sampling audio data, the second sampling video data, and the second sampling audio data, and adaptively determine quality of at least one of the first sampling video data, the first sampling audio data, the second sampling video data, and the second sampling audio data on the basis of the editing input, thus performing a function of distributing a computing load required to produce relay broadcasting content of video data or audio data received from a plurality of mobile devices.

According to an embodiment of the present invention, a digital device equipped with a memory unit and a microprocessor and having computing capability, such as a smartphone, a tablet, a desktop computer, a notebook computer, a workstation, a personal digital assistant (PDA), a mobile phone, etc. may be adopted as the repeater device 200 according to the present invention.

A configuration and function of the repeater device 200 according to the present invention will be described in detail through the following detailed description.

Next, according to an embodiment of the present invention, the photographer device 300 is a digital device including a function of transmitting video data captured or audio data recorded by a photographer to the repeater device 200. For example, a digital device equipped with a memory unit and a microprocessor and having computing capability, such as a smartphone, a tablet, a desktop computer, a notebook computer, a workstation, a PDA, a mobile phone, etc. may be adopted as the photographer device 300 according to the present invention.

Next, according to an embodiment of the present invention, the viewer device 400 is a digital device including a function of receiving video data, audio data, and editing data included in relay broadcasting content transmitted from the repeater device 200 and playing the relay broadcasting content using the video data, the audio data, and the editing data. For example, a digital device equipped with a memory unit and a microprocessor and having computing capability, such as a smartphone, a tablet, a desktop computer, a notebook computer, a workstation, a PDA, a web pad, a mobile phone, etc. may be adopted as the viewer device 400 according to the present invention.

In particular, the repeater device 200, the photographer device 300, and the viewer device 400 may include a dedicated application (not shown) that supports production of relay broadcasting content. Such an application may be downloaded from an external service providing server (not shown).

In this specification, unique functions that may be performed by the repeater device 200, the photographer device 300, and the viewer device 400 are described. However, it should be noted that the repeater device 200, the photographer device 300, and the viewer device 400 do not necessarily perform only the unique functions. That is, a mobile device may be any of the repeater device 200, the photographer device 300, and the viewer device 400 depending on its usage. For example, when a user performs capturing or recording using his/her mobile device, the mobile device may be the photographer device 300. When the user performs repeating using his/her mobile device, the mobile device may be the repeater device 200. When the user performs viewing using his/her mobile device, the mobile device may be the viewer device 400.

Configuration of Repeater Device

Figure 2:
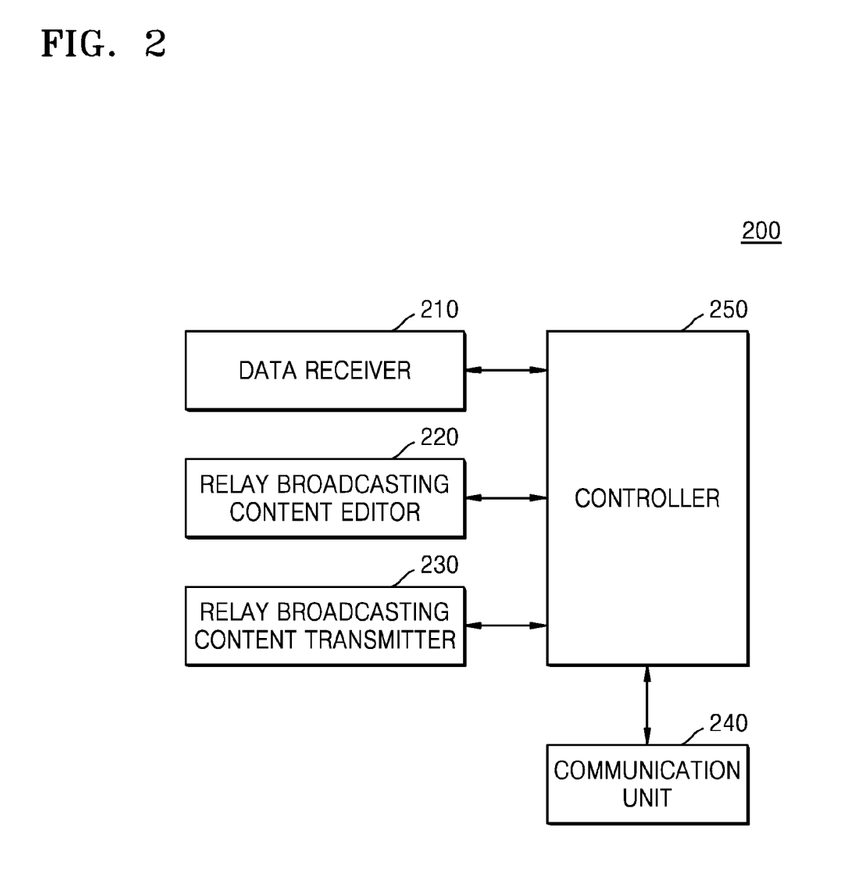
FIG. 2 is a diagram illustrating an internal configuration of a repeater device according to an embodiment of the present invention.

An internal configuration and functions of main elements of the repeater device 200 will be described below.

FIG. 2 is a diagram illustrating an internal configuration of the repeater device 200 according to an embodiment of the present invention.

Referring to FIG. 2, the repeater device 200 according to an embodiment of the present invention may include a data receiver 210, a relay broadcasting content editor 220, a relay broadcasting content transmitter 230, a communication unit 240, and a controller 250. According to an embodiment of the present invention, each of the data receiver 210, the relay broadcasting content editor 220, the relay broadcasting content transmitter 230, the communication unit 240, and the controller 250 may have a program module for communicating with the repeater device 200 as at least a part thereof. The program module may be an operating system, an application program module, or another program module, which may be included in the repeater device 200 and physically stored in various well-known memory devices. Also, the program module may be stored in a remote memory device that may communicate with the repeater device 200. The program module may encompass, but is not limited to, a routine, a subroutine, a program, an object, a component, a data structure, etc. for performing a specific task or executing a specific type of abstract data which will be described according to the present invention.

First, according to an embodiment of the present invention, the data receiver 210 may receive video data and audio data from at least one photographer device 300 that may communicate with the repeater device 200. In detail, according to an embodiment of the present invention, the data receiver 210 may function to receive first sampling video data and first sampling audio data of first video data and first audio data, respectively, generated by a first photographer device 300A and receive second sampling video data and second sampling audio data of second video data and second audio data, respectively, generated by a second photographer device 300B.

In more detail, according to an embodiment of the present invention, a plurality of first audio frames divided from the first audio data are included in the first sampling audio data, and a plurality of first video frames sampled from the first video data and synchronized with the plurality of first audio frames may be included in the first sampling video data. Also, according to an embodiment of the present invention, a plurality of second audio frames divided from the second audio data are included in the second sampling audio data, and a plurality of second video frames sampled from the second video data and synchronized with the plurality of second audio frames may be included in the second sampling video data.

Figure 3:
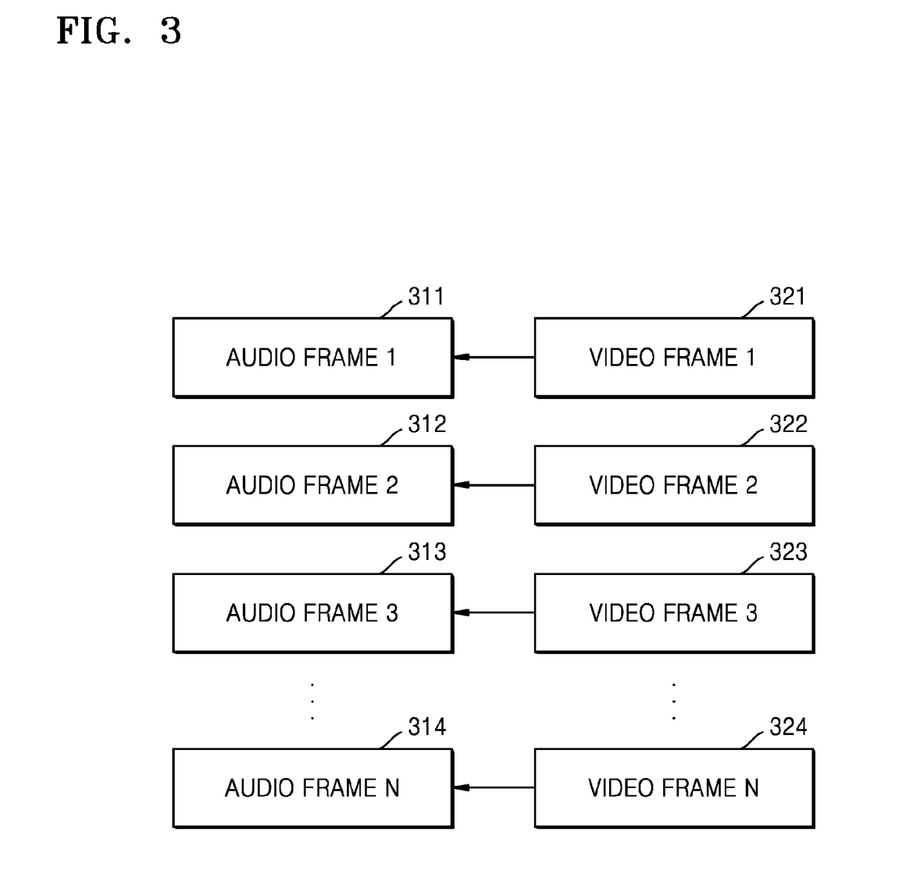
FIG. 3 is a diagram illustrating a configuration in which video data and audio data are sampled in a photographer device according to an embodiment of the present invention.

FIG. 3 is a diagram illustrating a configuration in which video data and audio data are sampled in a photographer device according to an embodiment of the present invention.

Referring to FIG. 3, audio data recorded by a microphone included in the photographer device 300 may be divided into a plurality of sections (hereinafter referred to as "audio frames") 311 to 314 at a certain sampling rate to form sampling audio data. A plurality of video frames 321 to 324 captured at the same sampling rate as described above from video data taken with a camera included in the photographer device 300 may form sampling video data. The plurality of audio frames may be synchronized with, and thus correspond to, the plurality of video frames.

With continuing reference to FIG. 3, when sampling is performed on the video data and the audio data N times per second, N video frames and N audio frames may be included in the sampling video data and the sampling audio data, respectively, while the video frames and the audio frames are synchronized with, and thus correspond to, each other during one second.

As computing performance of the photographer device 300 becomes insufficient or traffic of the communication network 100 increases, it may become difficult for the photographer device 300 to perform sampling (i.e., capturing) on video data at a predetermined sampling rate in real time. In this case, the photographer device 300 according to an embodiment of the present invention may reduce computing resources required for the sampling by overlapping at least two video frames which are included in the sampling video data (e.g., using an (N-1)th video frame that was already captured as an Nth video frame, rather than separately capturing video data for the Nth video frame).

Also, according to an embodiment of the present invention, each of the plurality of video frames forming the sampling video data may be a compressed image that is generated by compressing an image captured from original video data in a predetermined compression method. According to an embodiment of the present invention, the above compression process may be performed by the photographer device 300. Accordingly, according to the present invention, it is possible to reduce a load of a communication network by decreasing a size of the sampling video data and also to concentrate computing resources of the repeater device 200 on real-time editing by passing a computing load required to compress an image to the photographer device 300.

Next, according to an embodiment of the present invention, the relay broadcasting content editor 220 may function to provide the first sampling video data, the first sampling audio data, the second sampling video data, and the second sampling audio data to a repeater through the repeater device 200. Accordingly, according to an embodiment of the present invention, a repeater that performs editing using the repeater device 200 may receive the first sampling video data, the first sampling audio data, the second sampling video data, and the second sampling audio data in the form of a preview screen, check video taken or audio recorded by each of the first photographer device 300A and the second photographer device 300B in real time, and edit the relay broadcasting content by entering a certain editing input on the basis of the previewed video or audio.

Also, according to an embodiment of the present invention, the relay broadcasting content editor 220 may function to adaptively determine quality of at least one of the first sampling video data and the first sampling audio data received from the first photographer device 300A and the second sampling video data and the second sampling audio data received from the second photographer device 300B on the basis of an editing input of a repeater (that is, an editor) that is entered through the repeater device 200. Here, according to an embodiment of the present invention, the quality of the data may include a sampling rate, a resolution, a size, etc. of the data.

For example, according to an embodiment of the present invention, a sampling rate of first sampling video data to be edited by the repeater may be determined to be higher than that of second sampling video data not to be edited. As another example, according to an embodiment of the present invention, the resolution of the first sampling video data to be edited by the repeater may be determined to be higher than that of the first sampling video data before or after it is determined that the first sampling video data is to be edited.

Accordingly, according to an embodiment of the present invention, it is possible to transmit only specific video data or specific audio data to be edited by the repeater at a higher quality than other video data or other audio data not to be edited among pieces of video data and audio data received from a plurality of photographer devices 300, and it is also possible to significantly reduce data transmission loads between the repeater device 200 and the plurality of photographer devices 300 while enabling relay broadcasting content having a sufficiently high quality to be produced.

According to an embodiment of the present invention, a control signal for adaptively determining the quality of the sampling video data or the sampling audio data may be transmitted from the repeater device 200 to the first photographer device 300A or the second photographer device 300B.

Next, according to an embodiment of the present invention, the relay broadcasting content editor 220 may function to edit relay broadcasting content including the first sampling video data, the first sampling audio data, the second sampling video data, or the second sampling audio data received from the first photographer device 300A or the second photographer device 300B, on the basis of the editing input from a repeater.

In detail, according to an embodiment of the present invention, the relay broadcasting content editor 220 may function to generate data for editing the relay broadcasting content including the first sampling video data, the first sampling audio data, the second sampling video data, or the second sampling audio data with reference to an editing input from a user (that is, a repeater). For example, the editing data may include information regarding conversion between the first sampling video data and the second sampling video data, information regarding combination between at least one of the first sampling video data and the second sampling video data and at least one of the first sampling audio data and the second sampling audio data, information regarding subtitles combined with the first sampling video data or the second sampling video data, information regarding a graphic element combined with a specific area of the first sampling video data or the second sampling video data, information regarding a sound effect or relayed voice combined with the first sampling audio data or the second sampling audio data, etc.

Also, according to an embodiment of the present invention, the data for editing the relay broadcasting content may include text-based data having a format such as XML, JSON, etc.

Next, according to an embodiment of the present invention, the relay broadcasting content transmitter 230 may function to transmit data included in the relay broadcasting content among the first sampling video data, the first sampling audio data, the second sampling video data, and the second sampling audio data received from a plurality of photographer devices 300A and 300B and data for editing the data included in the relay broadcasting content to the viewer device 400 or a storage (not shown).

According to an embodiment of the present invention, when the sampling vide data or sampling audio data included in the relay broadcasting content and the editing data are received, the viewer device 400 may play the sampling video data or the sampling audio data included in the relay broadcasting content using the aforementioned dedicated application with reference to the editing data. Thus, the relay broadcasting content intended by the repeater device 200 may be provided to a viewer.

Figure 4:
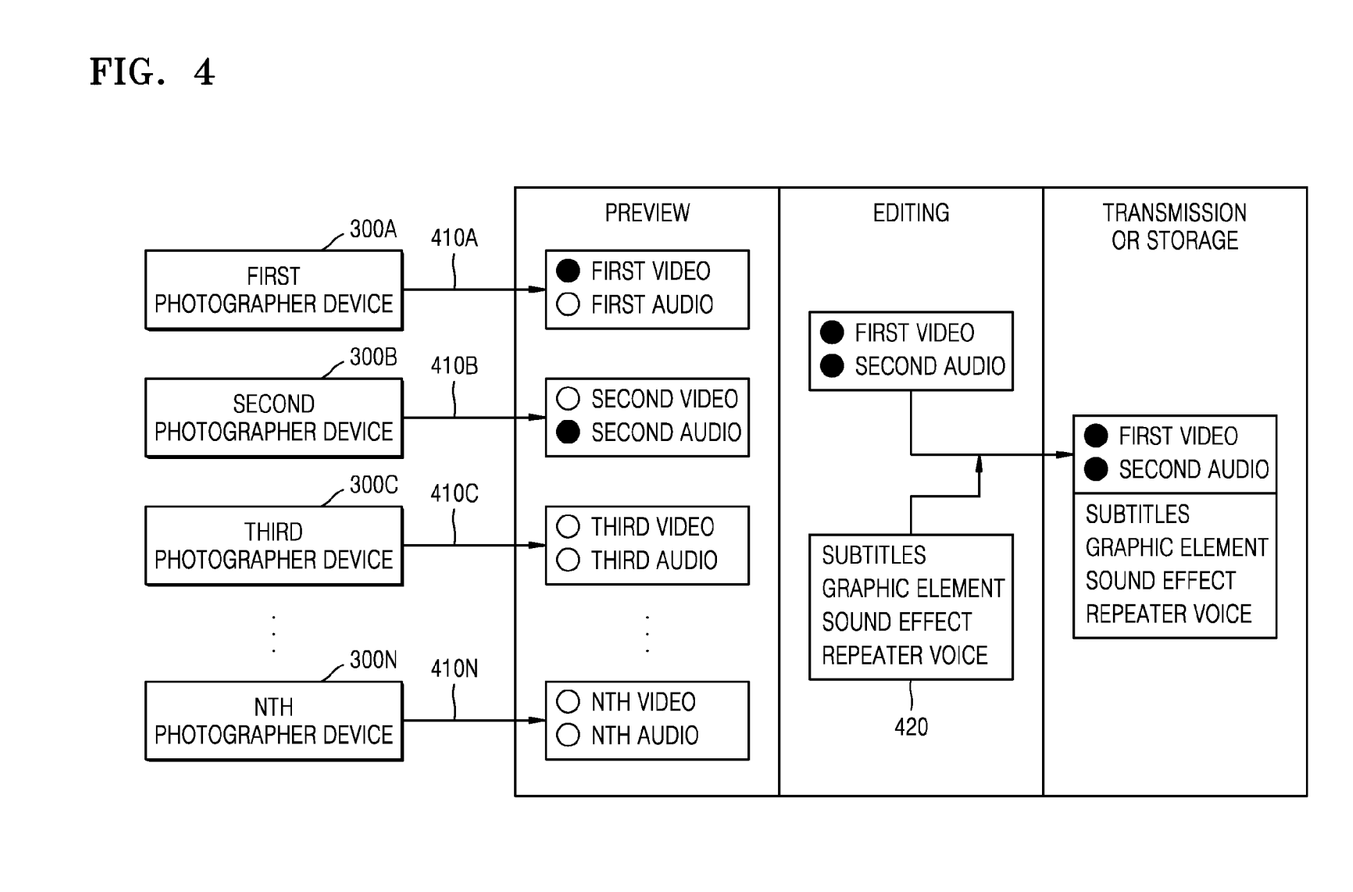
FIG. 4 is a diagram illustrating a configuration in which relay broadcasting content is produced using sampling video data and sampling audio data received from a plurality of photographer devices according to an embodiment of the present invention.

FIG. 4 is a diagram illustrating a configuration in which relay broadcasting content is produced using sampling video data and sampling audio data received from a plurality of photographer devices according to an embodiment of the present invention.

Referring to FIG. 4, it may be assumed that data to be edited by the repeater device 200 includes first sampling video data and second sampling audio data. In this case, according to an embodiment of the present invention, when a control signal based on an editing input is received, the first photographer device 300A may increase a sampling rate for the first video data (that is, video data included in the relay broadcasting content). Thus, quality of first sampling video data 410A received from the first photographer device 300A may increase to a level (e.g., 70% to 100%) similar to that of original data. On the other hand, according to an embodiment of the present invention, second to nth photographer devices 300B to 300N, which are the other devices that have received the control signal based on the editing input, may maintain sampling rates for the second to nth photographer devices 300B (that is, video data that is not included in the relay broadcasting content) at low levels. Thus, quality of the second to Nth sampling video data 410B to 410N received from the second to Nth photographer devices 300B to 300N may be maintained at even lower levels (e.g., 5%) than the original data.

With continuing reference to FIG. 4, editing data 420 specified by the editing input may form the relay broadcasting content along with first sampling video data 410A and second sampling audio data 410B, and the relay broadcasting content produced in this way may be transmitted to the viewer device 400 or stored in a certain storage (not shown).

According to an embodiment of the present invention, the plurality of photographer devices need not necessarily be present as separate devices, and a plurality of imagers or recorders physically included in one device may also be assumed to be the photographer device of the present invention.

Figure 5:
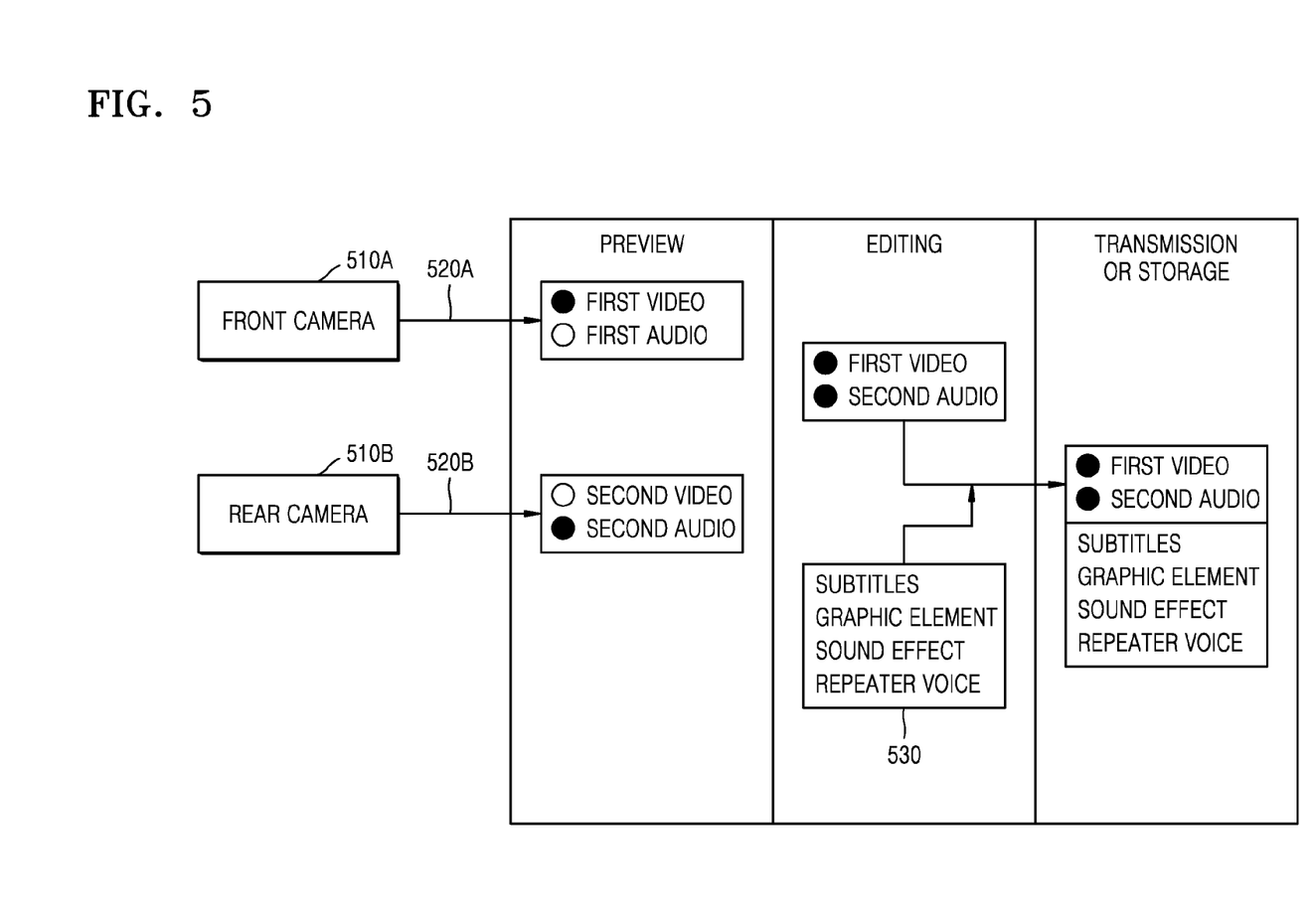
FIG. 5 is a diagram illustrating a configuration in which relay broadcasting content is produced using video data or audio data generated by a plurality of imagers or recorders included in one device according to an embodiment of the present invention.

FIG. 5 is a diagram illustrating a configuration in which relay broadcasting content is produced using video data or audio data generated by a plurality of imagers or recorders included in one device according to an embodiment of the present invention.

Referring to FIG. 5, first video data and second video data may be generated by a front camera 510A and a rear camera 510B included in one photographer device 300 (or one repeater device 200), respectively. As described in the embodiment of FIG. 4, first sampling video data 520A to be edited may have a higher sampling rate than second sampling video data 520B not to be edited.

Also, according to an embodiment of the present invention, editing data for editing relay broadcasting content may be specified by a touch-based editing input that is entered through the repeater device 200 in real time. For example, according to a touch input that is entered in real time to a certain area of a screen on which sampling video data that is being edited is played, various graphic elements such as images, subtitles, visual effects, etc. may be added to the certain area of the sampling video data. As another example, when a horizontal or vertical sliding touch manipulation is entered while a video from a rear camera is being previewed on a screen of the repeater device 200, the display state may be switched such that a video from a front camera is previewed on the screen of the repeater device 200.

Figure 6A:
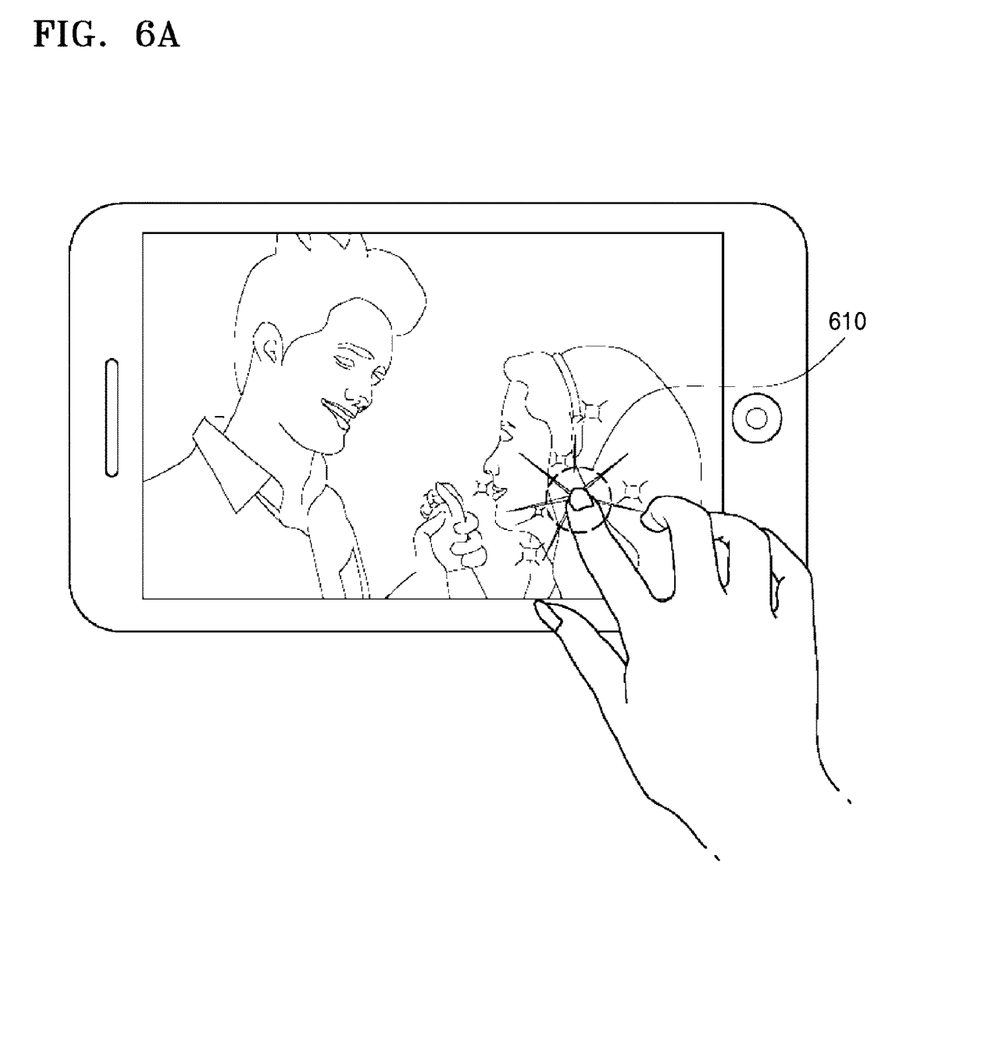
FIGS. 6A and 6B are diagrams illustrating a configuration in which editing is performed by a touch-based editing input according to an embodiment of the present invention.
Figure 6B:
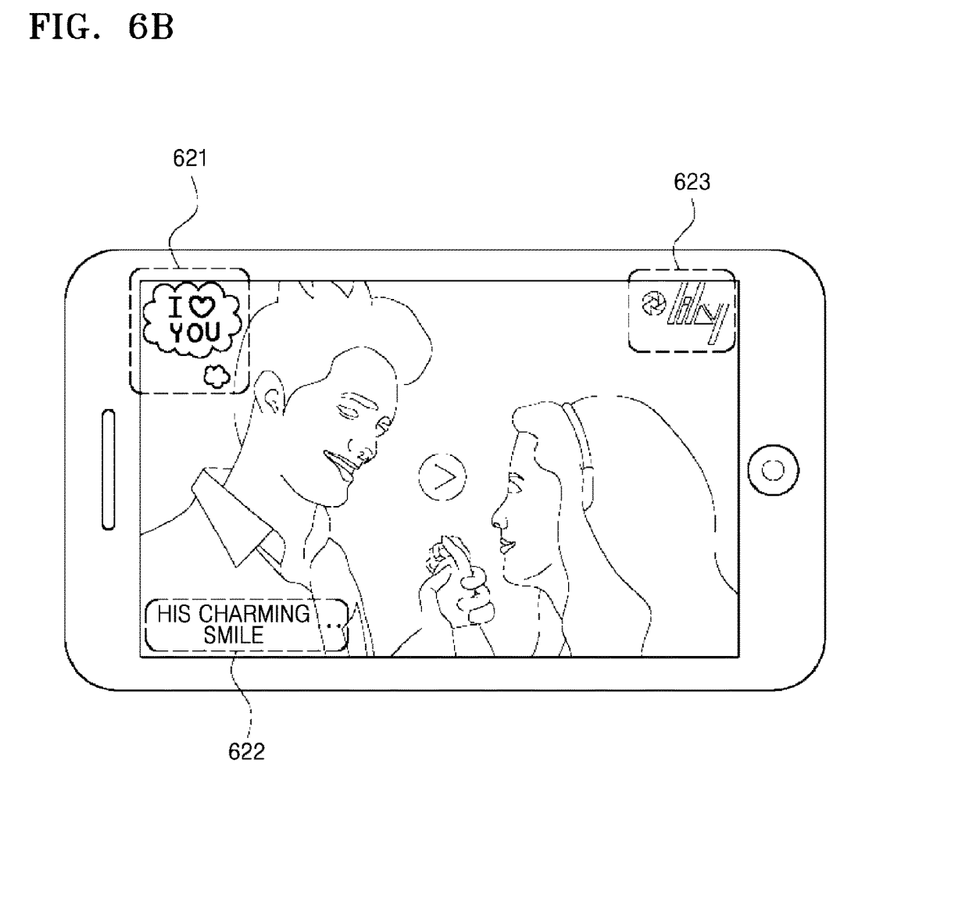

FIGS. 6A and 6B are diagrams illustrating a configuration in which editing is performed by a touch-based editing input according to an embodiment of the present invention.

Referring to FIGS. 6A and 6B, by an editor entering a touch manipulation 610 to a screen in which sampling video data is being played, various graphic elements 621, 622, and 623 may be added to a position to which the touch manipulation has been entered.

According to an embodiment of the present invention, a communication unit 240 functions to enable the repeater device 200 to communicate with an external system such as the photographer device 300 or the viewer device 400.

Last, according to an embodiment of the present invention, the controller 250 functions to control a flow of data among the data receiver 210, the relay broadcasting content editor 220, the relay broadcasting content transmitter 230, and the communication unit 240. That is, the controller 250 controls the data receiver 210, the relay broadcasting content editor 220, the relay broadcasting content transmitter 230, and the communication unit 240 to perform their unique functions by controlling a flow of data among elements of the repeater device 200 or a flow of data to/from the outside.

The embodiments according to the present invention described above may be implemented in the form of program instructions that may be executed through various computer components and recorded on a computer-readable recording medium. The computer-readable recording medium may include program instructions, data files, data structures, and the like individually or in combination. The program instructions recorded on the medium may be specifically designed for the present invention or may be well known to one of ordinary skill in the art of software. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device such as a ROM, a random access memory (RAM), or a flash memory that is specially designed to store and execute program instructions. Examples of the program instructions include not only machine code generated by a compiler or the like but also high-level language codes that may be executed by a computer using an interpreter or the like. The hardware device may be configured to operate as one or more software modules in order to perform operations of the present invention, and vice versa.

According to the present invention, it is possible to produce relay broadcasting content without performing a process that requires many computing resources for video data or audio data. Accordingly, a general user who has only a mobile device that may access typical wireless communication networks (e.g., a mobile communication network such as 3G or LTE, or a short-range communication network such as Wi-Fi, Wi-Fi Direct, and LTE Direct) can easily produce relay broadcasting content.

Also, according to the present invention, a user can make various editing effects while not being significantly affected by performance of equipment.

Also, according to the present invention, video data and audio data generated by a plurality of photographer devices may be directly sampled and synchronized by a corresponding photographer device, and quality (e.g., a sampling rate, a resolution, a data size) of sampling data may be adaptively determined on the basis of whether corresponding sampling data is to be edited. Thus, it is possible to reduce a computing load of a repeater device by distributing a computing load required to produce relay broadcasting content to a plurality of photographer devices and thus widen the range of photographer devices that may participate in relay broadcasting.

Although the present invention has been described with reference to the specific embodiments and drawings together with specific details such as detailed components, the embodiments are provided only for better understanding of the present invention, and thus the present invention is not limited thereto. Also, it should be apparent to those skilled in the art that various modifications and variations may be made from the above description.

Therefore, the spirit of the present invention is not be restricted or limited to the above-described embodiments, but is determined by the following claims and their equivalents.

What is claimed is:

1. A method of supporting relay broadcasting using a mobile device, which is performed by a repeater device, the method comprising:

receiving first sampling video data and first sampling audio data of first video data and first audio data, respectively, generated by a first photographer device and receiving second sampling video data and second sampling audio data of second video data and second audio data, respectively, generated by a second photographer device;

providing at least one of the first sampling video data, the first sampling audio data, the second sampling video data, and the second sampling audio data to the repeater device; and generating editing data for editing relay broadcasting content including at least one of the first sampling video data, the first sampling audio data, the second sampling video data, and the second sampling audio data with reference to an input of a repeater for editing at least one of the first sampling video data, the first sampling audio data, the second sampling video data, and the second sampling audio data, wherein:

quality of at least one of the first sampling video data, the first sampling audio data, the second sampling video data, and the second sampling audio data, which is transmitted from the first photographer device or the second photographer device and then received by the repeater device, is adaptively determined based on the editing input;

a control signal for adaptively determining the quality is transmitted from the repeater device to the first photographer device or the second photographer device;

quality of data to be edited is determined to be higher than quality of data not to be edited; and quality of specific data to be edited is determined to be higher than quality of the specific data before or after it is determined that the data is to be edited.

2. The method of claim 1, wherein the first photographer device and the second photographer device are physically included in one device.

3. A non-transitory computer-readable recording medium storing a computer program for executing the method of claim 2.

4. The method of claim 1, wherein:

the first sampling audio data includes a plurality of first audio frames divided from the first audio data, and the first sampling video data includes a plurality of first video frames sampled from the first video data and synchronized with the plurality of first audio frames; and the second sampling audio data includes a plurality of second audio frames divided from the second audio data, and the second sampling video data includes a plurality of second video frames sampled from the second video data and synchronized with the plurality of second audio frames.

5. A non-transitory computer-readable recording medium storing a computer program for executing the method of claim 4.

6. The method of claim 1, wherein the quality includes at least one of a sampling rate, a resolution, and a data size.

7. A non-transitory computer-readable recording medium storing a computer program for executing the method of claim 6.

8. The method of claim 1, wherein the editing data includes at least one of information regarding conversion between the first sampling video data and the second sampling video data, information regarding combination between at least one of the first sampling video data and the second sampling video data and at least one of the first sampling audio data and the second sampling audio data, information regarding subtitles combined with the first sampling video data or the second sampling video data, information regarding a graphic element combined with a specific area of the first sampling video data or the second sampling video data, and information regarding a sound effect or relayed voice combined with the first sampling audio data or the second sampling audio data.

9. The method of claim 8, wherein the editing data is specified by a touch-based editing input that is entered through the repeater device in real time.

10. A non-transitory computer-readable recording medium storing a computer program for executing the method of claim 9.

11. A non-transitory computer-readable recording medium storing a computer program for executing the method of claim 8.

12. The method of claim 1, further comprising transmitting the editing data and data included in the relay broadcasting content among the first sampling video data, the first sampling audio data, the second sampling video data, and the second sampling audio data to a viewer device or a storage.

13. A non-transitory computer-readable recording medium storing a computer program for executing the method of claim 12.

14. A non-transitory computer-readable recording medium storing a computer program for executing the method of claim 1.

15. A device for supporting relay broadcasting using a mobile device, the device comprising:

a data receiver configured to receive first sampling video data and first sampling audio data of first video data and first audio data, respectively, generated by a first photographer device and receive second sampling video data and second sampling audio data of second video data and second audio data, respectively, generated by a second photographer device; and a relay broadcasting content editor configured to provide at least one of the first sampling video data, the first sampling audio data, the second sampling video data, and the second sampling audio data to a repeater device and generate data for editing relay broadcasting content including at least one of the first sampling video data, the first sampling audio data, the second sampling video data, and the second sampling audio data with reference to an input of a repeater for editing at least one of the first sampling video data, the first sampling audio data, the second sampling video data, and the second sampling audio data, wherein:

quality of at least one of the first sampling video data, the first sampling audio data, the second sampling video data, and the second sampling audio data, which is transmitted from the first photographer device or the second photographer device and then received by the repeater device, is adaptively determined based on the editing input;

a control signal for adaptively determining the quality is transmitted from the repeater device to the first photographer device or the second photographer device;

quality of data to be edited is determined to be higher than quality of data not to be edited; and quality of specific data to be edited is determined to be higher than quality of the specific data before or after it is determined the data is to be edited.

* * * * *